9654X
J. Peery.
Circular Sawing Machine.
Patented May 14, 1836
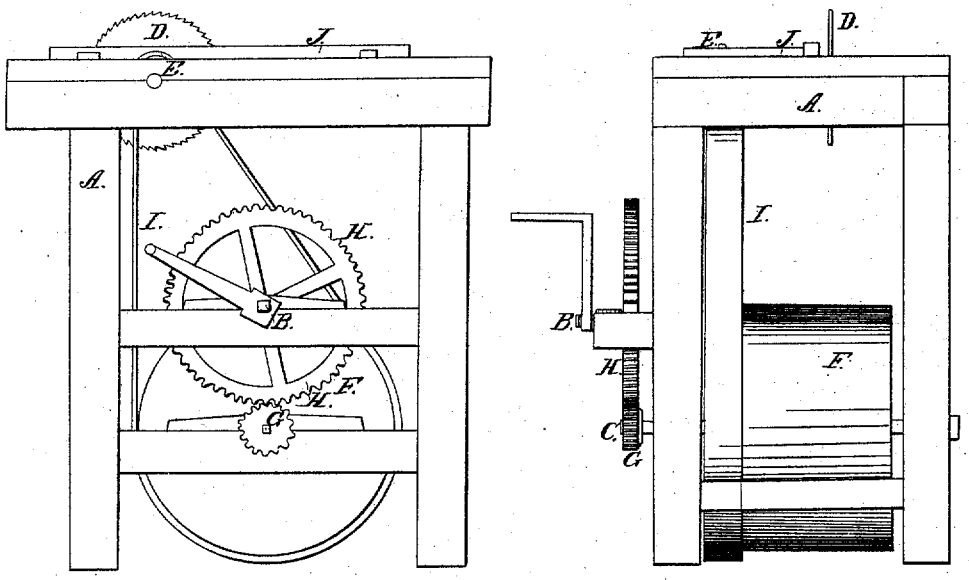
AM. PHOTO-LITHO. CO. N.Y. (OSBORNE'S PROCESS.)

9654X

May 14, 1836

Joseph Peavy of Levant Maine

Letters Patent.

The Schedule referred to in these Letters Patent and making part of the same containing a description in the words of the said Joseph Peavy himself of his improvement in the portable Sawing Machine.

Be it known that I Joseph Peavy of the Town of Levant, in the County of Penobscot, and State of Maine, have invented a new and useful improvement in the machine for sawing or slitting timber called "Peavy's Portable Sawing machine". which is described as follows, reference being had to the annexed drawings of the same making part of this specification. This machine consists of a rectangular frame A. of suitable size and strength for the purpose intended. across which are two horizontal shafts B & C. placed parallel to each other. one on the top and the other at the Bottom of the frame. The upper one carries a circular saw D. for cutting the timber and a small pulley E. by which it is driven, the lower shaft C carries the main drum F. and pinion G. by which it is turned. the pinion being turned by a cog wheel H working into it turned by hand or other power. A band I passes around the drum and pulley on the saw shaft. The top of the frame is covered with boards forming a table or rest to support the stuff to be sawed, and a guage J to regulate the stuff secured by clamp screws. The machine being put in motion, the stuff to be sawed is placed upon the guage and brought against the saw by hand and there held till it be cut as required. This machine can be moved from shop to shop or from place to place where stuff or timber is required to be cut. and with very little trouble and expense. What I claim as my invention and which I desire to secure by letters Patent, consists in the before described combination and arrangement of mechanical principles producing the machine here specified for the purposes above set forth.

Witnesses

Wm. P. Elliot

H. L. [illegible]wright [illegible]

Joseph Peavy